(12) United States Patent
Johansson et al.

(10) Patent No.: US 9,819,673 B1
(45) Date of Patent: Nov. 14, 2017

(54) AUTHENTICATION AND AUTHORIZATION OF A PRIVILEGE-CONSTRAINED APPLICATION

(71) Applicant: Amazon Technologies, Inc., Seattle, WA (US)

(72) Inventors: Jesper Mikael Johansson, Redmond, WA (US); Jon Arron McClintock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/748,312

(22) Filed: Jun. 24, 2015

(51) Int. Cl.
*H04L 29/06* (2006.01)
*H04L 12/911* (2013.01)
*H04W 12/06* (2009.01)
*H04W 12/08* (2009.01)

(52) U.S. Cl.
CPC .......... *H04L 63/0838* (2013.01); *H04L 47/70* (2013.01); *H04W 12/06* (2013.01); *H04W 12/08* (2013.01)

(58) Field of Classification Search
CPC .......... G06F 21/33; G06F 21/44; G06F 21/62; G06F 21/10; G06F 21/121; G06F 2221/2129; H04L 9/3268
USPC .......................................... 726/7, 26, 27, 29
See application file for complete search history.

(56) References Cited

U.S. PATENT DOCUMENTS

| | | | |
|---|---|---|---|
| 5,062,047 A | 10/1991 | Tanaka et al. | |
| 5,668,928 A | 9/1997 | Groner | |
| 5,835,722 A | 11/1998 | Bradshaw et al. | |
| 5,880,523 A | 3/1999 | Candelore | |
| 6,134,659 A * | 10/2000 | Sprong ............... | G06Q 20/3674 380/255 |
| 6,233,339 B1 | 5/2001 | Kawano et al. | |
| 7,036,075 B2 | 4/2006 | Walker | |

(Continued)

FOREIGN PATENT DOCUMENTS

WO    2009038446 A1    3/2009

OTHER PUBLICATIONS

Privacy-Preserved Access Control for Cloud Computing, Zhou et al, IEEE 2011, Trust, Security and Privacy in Computing and Communications (TrustCom), 2011 IEEE 10th International Conference, 10.1109/TrustCom.2011.14.*

(Continued)

*Primary Examiner* — Jahangir Kabir
(74) *Attorney, Agent, or Firm* — Davis Wright Tremaine LLP

(57) ABSTRACT

Methods and systems are provided for managing access to a client account related (CAR) resource. When a privilege-constrained (PC) application requests access to an individual client account, a single use authorization (SUA) code is created that is associated with the individual client account. The SUA code is routed to, and returned from, the privilege-constrained (PC) application to authenticate the PC application. The PC application, once authenticated, receives a permitted action token that identifies a limited set of privileges that the PC application is authorized to perform in connection with the CAR resource. The PC application provides the permitted action token to an access service. The access service limits access, by the PC application, to the CAR resource based on the permitted action token.

15 Claims, 11 Drawing Sheets

(56) References Cited

U.S. PATENT DOCUMENTS

| | | | |
|---|---|---|---|
| 8,972,445 B2 | 3/2015 | Gorman et al. | |
| 9,237,305 B2 | 1/2016 | Guzman et al. | |
| 2003/0204392 A1 | 10/2003 | Finnigan et al. | |
| 2005/0005266 A1 | 1/2005 | Datig | |
| 2009/0146267 A1 | 6/2009 | Peytavy et al. | |
| 2010/0082333 A1 | 4/2010 | Al-Shammari | |
| 2014/0013390 A1* | 1/2014 | Sade | G06F 21/42 726/3 |
| 2014/0032584 A1 | 1/2014 | Baker et al. | |
| 2014/0040312 A1 | 2/2014 | Gorman et al. | |
| 2014/0047523 A1* | 2/2014 | Swerdlow | G06F 21/62 726/7 |
| 2014/0344942 A1* | 11/2014 | Headley | G06F 21/121 726/26 |
| 2015/0039803 A1 | 2/2015 | Yamamoto | |
| 2015/0206149 A1* | 7/2015 | Kurian | G06Q 20/385 705/71 |
| 2016/0099941 A1* | 4/2016 | Hein | H04L 63/0838 726/4 |

OTHER PUBLICATIONS

Assigning cryptographic keys to access control in a multi-attribute hierarchy, Guan et al, IEEE 2003, Security Technology, 2003. Proceedings. IEEE 37th Annual 2003 International Carnahan Conference, 10.1109/CCST.2003.1297582.*

Secure Communication and Access Control for Web Services Container, Peng et al, IEEE 2006, Grid and Cooperative Computing, 2006. GCC 2006. Fifth International Conference, 10.1109/GCC.2006.85 10.1109/GCC.2006.85.*

* cited by examiner

AUTHENTICATION AND AUTHORIZATION OF A PRIVILEGE-CONSTRAINED APPLICATION

BACKGROUND

A variety of applications are available for use on computing devices today that require a certain level of trust establishment between the applications and various resources. For example, an application may need the user to grant the application the ability to access a client account and/or access to sensitive user data (e.g., financial data). As another example, an application may need the user to provide the application with the user's ID and password to an account in order to take actions on behalf of the user relative to the account. For example, a bill paying application may need a user's ID and password to their bank account in order to perform bill paying functions. The application would then present the username and password to the e-commerce service as authentication in order to perform the actions for which the application is being used.

However, such authentication techniques placed users at risk, requiring them to fully trust an application. Once their username and password are provided to the application, the user may not have full knowledge of the particular actions taken by the application or may not fully realize how the application is using the user's personal data. Conventional authentication techniques that seek to provide more security are complex, fragile and disrupt the user experience.

A need remains for a more robust and less disruptive technique for establishing trust with an application seeking to perform select actions relative to a client account.

DETAILED DESCRIPTION

Figure 1A:
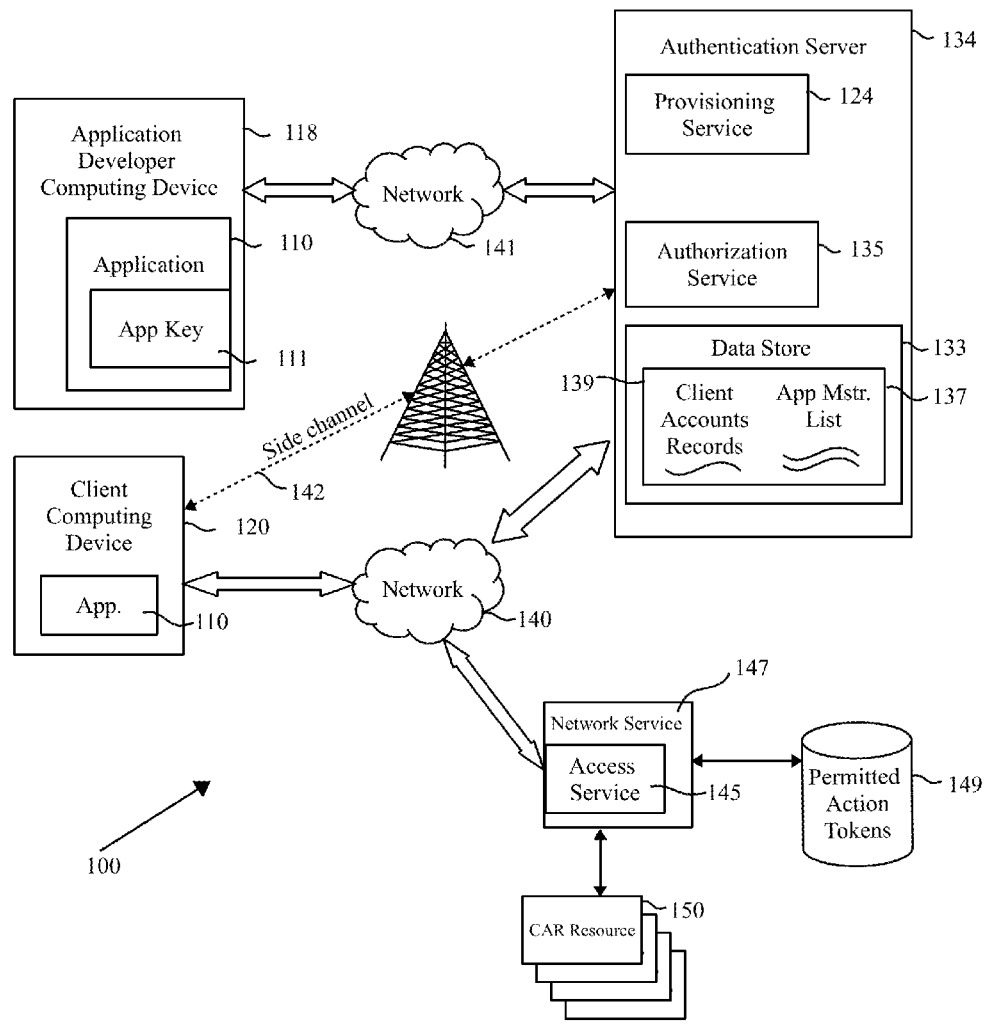
FIG. 1A is a block diagram of a system for providing applications access to online client account related resources according to various embodiments described herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In embodiments herein, systems, methods and computer program products are provided to authenticate and authorize a privilege-constrained application that desires to take a limited set of actions in connection with a client account on an online resource. Numerous applications exist that may be loaded on a smart phone, tablet, laptop, and utilized in connection with various online accounts, such as an account with an e-commerce provider, a financial institution, and the like. In the past, once the user provided their ID and password to the application, the user placed their personal information at potential risk as the user no longer retained control over access by the application to information in the client account. The user also lost a certain amount of control over what types of actions the application may perform through the client account.

Embodiments herein enable the user to retain control over the actions taken by applications in connection with a user account (also referred to herein as a client account). To do so, embodiments are described herein that interact with an application at numerous points in time. At the time of development, limits are placed on the privileges afforded to an application, referred to throughout as a privilege-constrained (PC) application. In addition, before a PC application can initiate a session with a user's online account (also referred to as a client account or client online account), the PC application undergoes an authentication process by which single use authorization (SUA) codes are conveyed over at least two separate communications channels between one or more client computing devices and an authentication server. Once the authentication server authenticates that the PC application, the authentication server provides a token to the PC application (referred to throughout as a permitted action token). The permitted action token identifies a limited set of privileges that the PC application is authorized to perform in connection with the client account through the online resource. The permitted action token is presented by the PC application to a network service (e.g. Web server) when the PC application seeks to access a client account through an online resource (e.g., a webpage for a client e-commerce account or a webpage for a client bank account). The network service only grants the PC application particular privileges associated with the permitted action token. As an example, if a permitted action token indicated that the PC application may only view user data in an account, but the PC application sought (albeit improperly) to perform a financial transaction through the client account, the network service would deny the request to complete the financial transaction. The permitted action token may be revoked, modified or otherwise managed to change the privileges associated with a PC application.

Other features and benefits are provided in accordance with embodiments herein as described hereafter.

Overall Architecture

FIG. 1A is a block diagram of a system 100 for providing an application access to client account related (CAR) remote resources (e.g., an online resource) according to various embodiments described herein. The term "client account related" is used in a general manner to indicate that client accounts are accessed through the remote or online resource and/or the remote or online resource is utilized to perform one or more actions in connection with client accounts. The system 100 includes one or more client computing devices 120 that are accessible to a user and are configured to communication via a network 140 with one or more CAR online resources 150 through one or more corresponding network services 147. The network service 147 includes an access service 145 that, among other things, monitors requests (and tokens) from client computing devices 120. The access service 145 allows or blocks passage of each request to a corresponding CAR online resource 150 based on one or more tokens (also referred to as permitted action tokens) that is included with the request.

By way of example, the client computing device 120 may be a mobile device, such as a cellular telephone, smartphone, electronic book, tablet, or other portable electronic terminal that is configured to access the network 140 over a wired or wireless connection. Additionally or alternatively, the client computing device 120 may be a wired or wireless communication terminal, such as a desktop computer, laptop computer, network-ready television, set-top box, and the like. The client computing device 120 may be configured to access the network using a web browser or a native application executing thereon. In some embodiments, the client computing device 120 may have a physical size or form factor that enables it to be easily carried or transported by a user, or the client computing device 120 may have a larger physical size or form factor than a mobile device.

Optionally, the client computing device 120 for a single user may include more than one device. For example, a smart watch in combination with a smart phone may perform the operations described herein. For example, the PC application 110 may operate on a smart watch, while the smart phone is used to form the second/side channel to convey the single use authorization code to/from the user during session authentication. As another example, the PC application 110 may operate on a laptop, desktop, tablet device, while a cellular phone is used to form the second/side channel during session authentication. Alternatively, the PC application 110 may operate on the smart phone or cellular phone, while the smart watch, laptop, desktop, tablet or other device is used to form the second/side channel during session authentication.

The client computing device 120 is configured to access online resources 150, including web-based or network-based data, applications, and services, via the network 140. The network 140 may represent one or more of a local area network (LAN), a wide area network (WAN), an Intranet or other private network that may not be accessible by the general public, or a global network, such as the Internet or other publicly accessible network. The network 140 provides communication between the client computing device 120 and one or more online resources 150 through one or more network services 147 (such as web servers). The network service 147 may represent a server and/or other computing device that includes one or more network transceivers, processors, memory, and other circuitry configured to coordinate and manage operations for receiving requests and responding, thereby maintaining online sessions with applications 110.

The CAR online resources 150 may represent client account related resources that utilize client specific data or other information not readily available to the public. For example, the CAR online resource 150 may represent one or more features or functions within an e-commerce service, for example a Wish List in an e-commerce catalogue service, such as provided by Amazon.com. As another example, the client account related online resource 150 may represent one or more features provided by a financial service, such as by a bank, credit card company, mortgage or other lending institution, a frequent flyer account, as well as many other numerous types of e-commerce services. Other examples of the CAR online resources 150 include, but are not limited to, web-based or network based data storage services, social networking applications, shopping services, microblogging accounts, payment services, multimedia content delivery services (for delivery of online magazines, music, video, etc.) and financial services (such as credit/banking services). The resource 150 may represent a Web service or a network service for an e-commerce business, financial institution, or any other commercial, noncommercial, personal, nonprofit or other entity. The CAR online resources 150 may also refer to network-accessible data, applications, services, or combinations thereof that require an account or subscription to access the content or services provided thereby. In the example of FIG. 1A, the CAR online resources 150 are described as "online" resources. However, it is understood that the resources 150 are not limited to online resources, but instead may correspond to other client account related remote resources (e.g., automated teller machines). A "remote" resource represents any resource that is implemented on a device, server, system or other entity, that is physically separate and distinct from the client computing device 120. Hence, an online resource is an example of a remote resource.

The system 100 also includes an authentication server 134 that includes one or more processors and memory that stores program instructions to define a provisioning service 124, an authorization service 135. The memory of the authentication server 134 also includes a data store 133. The authentication server 134 seeks to afford the PC application 110 a limited set of privileges relative to client accounts/data in a secure manner that the system 100 may audit throughout operation without granting the PC application 110 unlimited access to a client account and without exposing all of the user's personal credentials to the PC application 110.

The system 100 further includes numerous application developer computing devices 118 that are operated by application developers to provide applications that interact with CAR online resources. The application developer computing devices 118 may be any type of computing device (similar to or different from the client computing devices 120). The application developer computing devices 118 communicate over a network 141 with the provisioning service 124 when an application developer desires to create and publish applications 110 for use with the system 100. The applications 110 may offer various features and functions to the client. However, to offer such features and functions the PC application 110 will need to access at least limited client data and/or will need to perform certain actions in connection with the client data and/or a client account.

An application developer requests permission and certain information from the authentication server 134 when desiring to create a new application. For example, the developer may desire to create an application that performs certain actions on behalf of a user, or accesses certain user data in connection with performing the operations of the application. As one example, an application may be created to perform certain actions in connection with items in a user's Wish List in an e-commerce online account. For example, the application may determine when items go on sale, become available, or maybe found cheaper elsewhere. Other examples of applications may concern actions to be taken in connection with financial accounts, such as an application to perform online bill payment, check account balances, etc. In order to perform an action, the application may login to a financial account and perform a series of actions needed to initiate an automated bill payment. Another example may concern travel and/or entertainment, such as an application to automatically booking dinner reservations, flights, hotel rooms, car reservations and the like. To perform travel and/or entertainment related actions, an application may access a restaurant webpage, login to a client account with an airline service (e.g., frequent flyer account), hotel booking service, rental car booking service and the like. The application may take the appropriate actions, such as to create a reservation, check a points balance, provide the user with alternative travel options (e.g., flight times, hotel locations, car type options, prices, dates, etc.). The above examples are non-limiting examples and it is recognized that numerous types of applications may be created that need access to at least one type of user data or need to take at least one action on behalf of a user.

In an application provisioning process, when the application developer provides information to the authentication server 134 regarding the nature of the application, the particular CAR online resources of interest, the privileges that the application will need (e.g., a list of the actions that the application seeks to take). The developer may establish a relationship with the owner or manager of the CAR online resource and obtain approval to publish the PC application in connection there with. When an application is approved, the provisioning service 124 issues an application identifier (e.g., serial number) and application key (e.g., sign in key, public key, private key, etc.) uniquely tied to the particular application. The provisioning service 124 records the application ID and application key on an application master list 137 in the data store 133. The provisioning service 124 also saves any privileges granted to the application with the application ID and key, as well as any other information of interest (e.g., version number, hardware requirements, online resource compatibilities). The application ID, key and privileges are stored on the application master list 137 for future reference as explained herein. The privileges may include various content, such as a list of actions that are permitted by the application. The privileges may identify the type of request that the application may direct to online resources. The privileges may identify the type of client data that may or may not be requested from an online resource.

Once a privilege-constrained (PC) application 110 is published, users download the application or otherwise load the PC application 110 onto individual client computing devices 120. For example, the PC application 110 may be downloaded over the network 140, loaded from a CD ROM, a flash drive, or other storage medium. The PC application 110 is activated, such as by booting up a limited use operating system, opening an application and the like.

The data store 133 contains, among other things, account information for one or more clients in client account records 139 and the application master list 137. The data store 133 may be embodied in nonvolatile memory, such as flash, magnetic, or optical rewritable nonvolatile memory. The account information in the client account records 139 may include a listing of accounts and online resources to which the accounts correspond. For example, the client account records 139 may include one or more user ID, and user credential associated with each resource. The user ID may include information identifying the corresponding client that has registered for the associated CAR online resource, such as the customer's name, e-mail address, phone number, etc. The client credentials represent information that may be used to verify or authenticate the client to access the account. For example, the client credentials may include a password selected by the client to access the account, encryption keys, client certificates, bearer tokens, and the like. In accordance with embodiments described herein, the client account information stored in the data store 133 further includes registration information identifying a secure environment associated with each account.

The client computing devices 120 and application developer computing devices 118 may represent a cellular phone, tablet device, text messaging device, permanent home phone, a set-top box, a wearable device such as a smart watch or smart glasses, a home automation device, a network attached storage device or any other communications device that is generally uniquely identifiable and uniquely associated with an individual user (such as through a telephone number, IP address or otherwise). The client computing devices 120 are configured to communicate over at least two separate communications channels with the authentication server 134, namely a first/primary channel and a second/secondary/side channel. By way of example, the first or primary channel may represent a network connection through the network 140, while the second or side channel may represent a cellular telecommunications channel 142 through a cellular network. The cellular network in turn communicates with the authentication server 134 as explained herein. The communication between a client computing device 120 and the cellular network may be unidirectional or bidirectional. The side communications channel 142 may be provided by any communications provider, such as any source that disseminates information.

The network service 147 and access service 145 provide a secure and privilege-constrained network connection between the client computing device 120 and one or more CAR online resources 150, after the authentication server 134 has confirmed that the client computing device 120 and application 110 is trustworthy. As explained herein, an application 110 requests to open a PC session. The authentication service 135 verifies the PC session request and provides a permitted action token to the PC application 110. The permitted action token identifies a limited set of privileges that the PC application is authorized to perform in connection with the CAR online resource. The PC application 110 presents the permitted action token to the access service 145 in connection with establishing a privilege-constrained session with one or more CAR online resources 150.

As one example, the application master list 137 may store the permitted action tokens to be provided corresponding applications, upon request, in order for the application to perform the permitted actions through the network service

147. For example, different types of permitted action tokens may be associated with particular actions. An access service 145 may receive a permitted action token and based thereon permit a corresponding type of request to be passed to a CAR online resource 150. When incoming permitted action tokens do not match the type of request, the access service 145 may block or otherwise deny conveyance of the request to the CAR online resource 150. For example, the permitted action token includes an indication that the PC application 110 is authorized to perform at least one permitted action. Additionally or alternatively, the permitted action token may include an indication that the PC application 110 is denied permission to perform at least one blocked action in connection with the remote resource. As non-limiting examples, permitted actions may include obtaining a list of content in a wish list, obtaining a balance for a financial account, placing an order for a product or service, requesting a status on a prior order, performing a search of products/services, and the like. Non-limiting examples of blocked actions include withdrawing money from an account, purchasing a product or service, requesting financial account numbers (e.g., bank account number, credit card number), and the like. A permitted action token may correspond to one type of action or may refer to multiple types of actions (e.g., non-financial actions or review related actions). A new permitted action token may be provided to change (e.g., add or remove) the actions permitted. Optionally, multiple permitted action tokens may be provided to a PC application to be passed as a group or individually to the access service 145. The term "blocked action" is not limited to an itemized list of actions to be denied. Instead, in some embodiments, individual actions may not be itemized as "blocked action." Instead, embodiments may establish a deny policy wherein, by default, some or all actions are denied, except for specifically identified permitted actions or groups/classes of permitted actions.

Although FIG. 1A illustrates an example in accordance with some embodiments, it will be understood that the present disclosure is not limited to such a configuration but is intended to encompass any configuration capable of carrying out the operations described herein. For example, although primarily discussed above with reference to a single authorization service 135 and single provisioning service 124, some embodiments may include a plurality of distributed network elements that collectively perform the operations described herein. As one example, the provisioning service 124 and authorization service 135 may be implemented on different servers or other physical entities. Likewise, it will be understood that the operations performed by the online resources 150, network server 147 and authorization server 134 may be performed by a single entity in some embodiments or different entities. More generally, various functionality described herein with reference to separate functional elements may be combined within a single functional element and, vice versa, functionality described herein in single functional elements can be carried out by a plurality of separate functional elements.

While illustrated as a single entity in FIG. 1A, it will be understood that, in some embodiments, the network service 147 and online resources 150 may represent one or more physical or virtual services that are configured to deliver online resources to the client computing device 120.

The services executed on the authentication server 134 and network service 147 includes other applications, services, processes, systems, engines, or functionality not discussed in detail herein. The network service 147 may provide functionality related to email, social networking, electronic commerce, video content delivery, and/or other types of services for which a user may have an account. The service 147 may encompass any number of back-end modules or logic to provide the particular functionality to client computing devices 120. The authentication server 134 and network service 147 may communicate with client computing devices 120 over the networks 140 and 141 by way of hypertext transfer protocol (HTTP), simple object access protocol (SOAP), representational state transfer (REST), real-time transport protocol (RTP), and/or other protocols and approaches. In one embodiment, the network service 147 may correspond to a network site, such as a web site, which is accessed by way of a browser or other client application.

The access service 145 receives, at least with an initial client request, one or more user credentials from client computing devices 120 and determines whether the user credentials are valid for an account on the CAR online resource. The user credentials may include session identifiers, passwords, encryption keys, certificates, bearer tokens, answers to knowledge-based questions, Kerberos tickets, Internet protocol (IP) addresses, and/or other forms of authentication credentials. In one embodiment, the access service 145 may comprise one or more network pages including forms facilitating entry of user credentials. In another embodiment, the access service 145 may comprise a uniform resource locator (URL) facilitating access to an application programming interface (API) for programmatic submissions of security credentials.

The network service 147 also includes a data store 149 that includes, for example, service data, client account information, associations between permitted action tokens and privileges that are permitted, as well as other potential data. The service data corresponds to various data resources employed by the service 147. To this end, the service data may include hypertext markup language (HTML) data, extensible markup language (XML) data, images, audio, video, animations, executable code, and/or other data.

The communication channel 142 may present a trusted channel that is "trusted" in the sense that it is presumed to be controlled by the owner of the respective client account. In other words, access to a trusted channel of communication 142 may be used to authenticate the owner of the respective client account. The decision to trust a particular channel of communication may be made by an organization. For example, irrespective of whether email is inherently trustworthy or untrustworthy, email may be designated as a trusted channel of communication 142 by an organization that manages or provides the client accounts. Channels that are designated as trusted may later be designated as untrusted in some scenarios.

To illustrate the use of a trusted channel of communication 142, when creating a social networking account, a user may provide an email address for reset purposes. The provider of the social networking account may then trust that the email address is controlled by the user because access to the email account corresponding to the email address may facilitate resetting the password to the social networking account. It may be the case that the trusted channel of communication 142 employs a different communication protocol from what is employed by the client account. For example, the client account may employ hypertext transfer protocol (HTTP), while the trusted channel of communication 136 may employ simple mail transfer protocol (SMTP).

Non-limiting examples of trusted channels of communication 136 may include email accounts, telephone lines, mailing addresses, social networking accounts, instant messaging systems, voice over internet protocol (VoIP) channels, mobile device management (MDM) channels, trusted input/output devices of the client computing devices 120 managed by a trusted platform module (TPM), near-field communications (NFC) channels, custom communications channels, and/or other channels of communication.

Certain types of trusted channels of communication 142, such as email and short message service (SMS), may terminate on multiple client computing devices 120. Other types of trusted channels of communication 142 are device specific, such that the trusted channel of communication 142 can only terminate at one specific client computing device 120. For example, a trusted channel of communicate 142 may be tied to a specific mobile device by a device identifier. Communications through such a channel may be encrypted using the device identifier. Even if the data traffic to the mobile device is intercepted, it remains encrypted and otherwise unusable except for the specific mobile device.

The client computing device 120 is representative of a plurality of client computing devices 120 that may communicate over the network 140. The client computing device 120 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client computing device 120 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

Figure 1B:
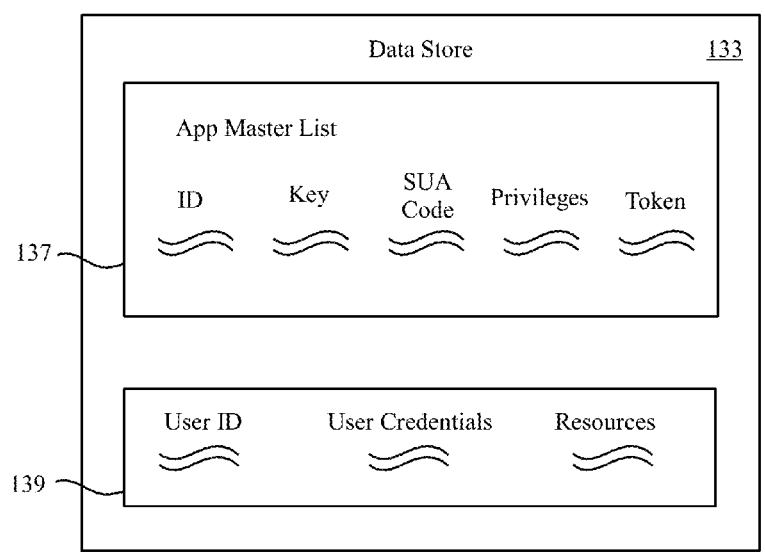
FIG. 1B illustrates a data store formed in accordance with embodiments herein.

FIG. 1B illustrates a data store 133 formed in accordance with embodiments herein. The data store 133 includes, among other things, the application master list 137 and the client account records 139. The application master list 137 includes an application ID uniquely assigned to each application that is provisioned, an application key also uniquely assigned to each application. During operation one or more SUA codes may be generated in connection with active applications. The SUA codes are saved with the corresponding application ID and key. Each application is granted one or more privileges that the application is permitted to perform in connection with individual client accounts. The privileges are also saved in the application master list 137. As explained herein, during operation one or more permitted action tokens are generated in connection with active applications seeking to initiate sessions with CAR online resources. The permitted action tokens are recorded on the application master list when generated.

Figure 2A:
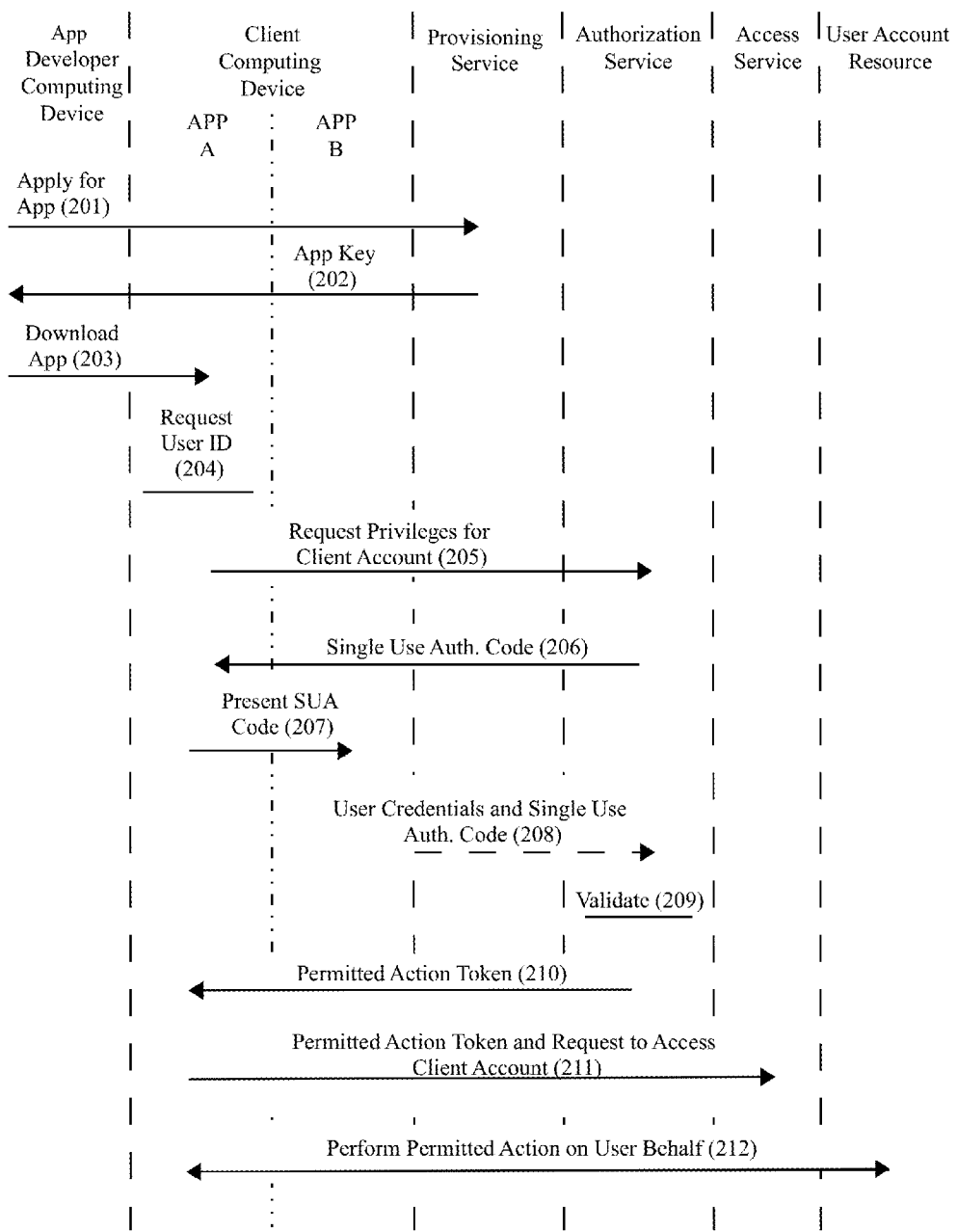
FIG. 2A illustrates a flow diagram of the exchange of information between portions of the system of FIG. 1A in accordance with embodiments herein.

FIG. 2A illustrates a functional diagram of portions of the system 100 of FIG. 1 as well as certain data, information and content conveyed there between. FIG. 2A illustrates functional operations performed by the application developer computing device 118, the client computing device 120, the provisioning service 124, the authorization service 135, the access service 145 and the CAR online resources 150. To establish the trustworthy nature of the application and the permitted actions, the provisioning service 122 and authorization service 132 exchange information and data with the client computing device 120 over at least two separate channels, such as through a first network connection (over a network 140) and through a second separate communications channel 142. In the example of FIG. 2A, the client computing device 120 is functionally divided into first and second PC applications, referred to as APP A and APP B. The functionality performed by the first and second applications APP A and APP B present different portions of the overall PC application 110. The first and second applications (APP A and APP B) collectively define the privilege-constrained application 110. The applications APP A and APP B may be implemented as different parts of a common application or as different types of applications operating on a common client computing device 120. For example, the application APP A may be present a set of stand-alone windows to provide the corresponding functionality, while the application APP B may operate through a web browser, an email account, a text messaging interface or otherwise. Optionally, the applications APP A and APP B may be implemented on separate client computing devices. The SUA code is provided to the first application (e.g., APP A) over a first channel and the candidate SUA code is received from the second application (e.g., APP B) over a different second channel.

The application developer submits a request to apply for approval (201) to publish (e.g., make available for download) an application that access CAR online resources. The provisioning service 124 (FIG. 1A) assigns an application key that is passed back (202) to the application developer to be embedded within the PC application 110 (e.g., APP A). Once the application is developed and published, client computing devices download (203) the PC application 110 (e.g., APP A). Once downloaded, the PC application 110 requests an user ID (204) from the user, such as in connection with application registration. The user ID is saved by the PC application 110 for subsequent use, each time the PC application 110 is activated.

Figure 2B:
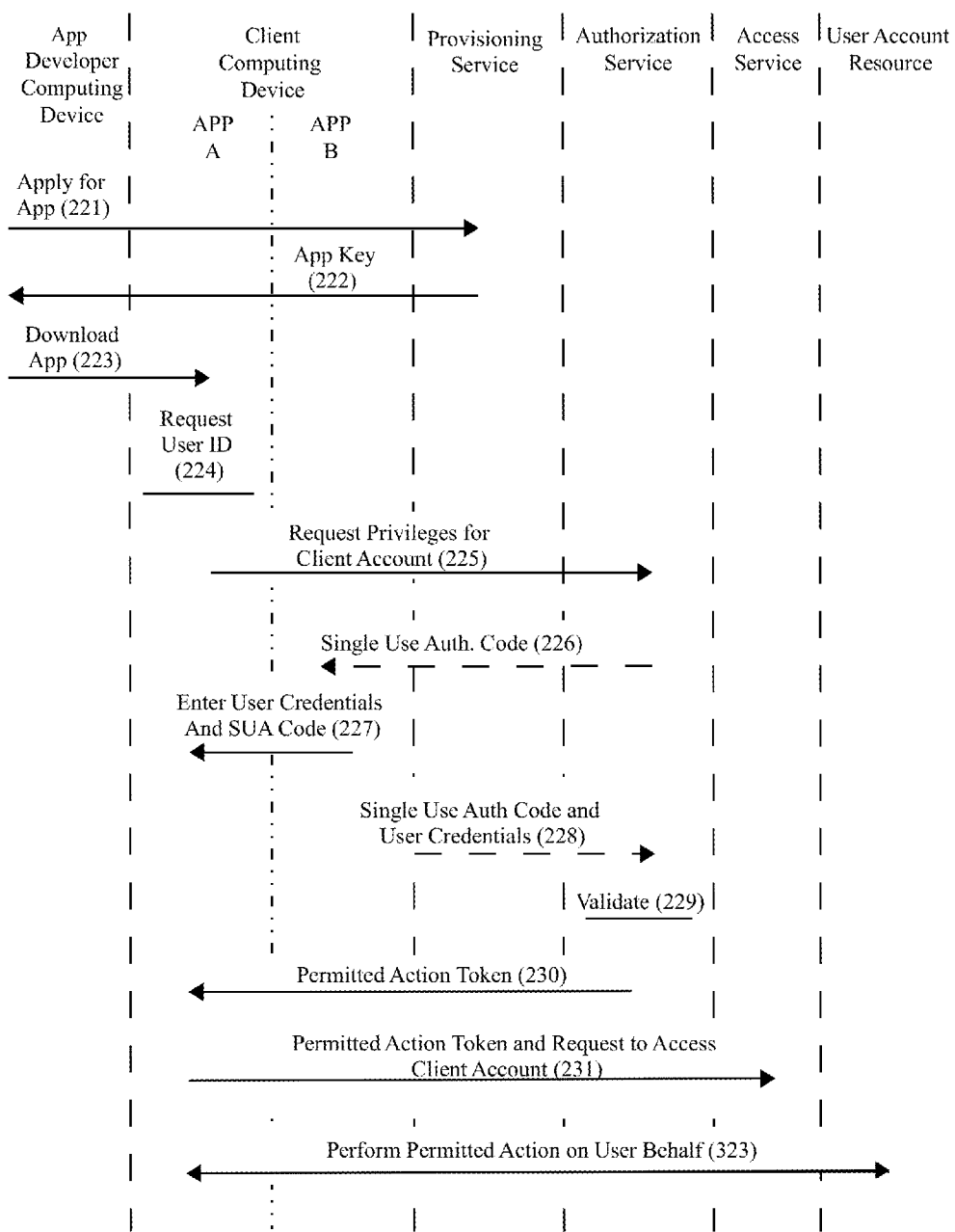
FIG. 2B illustrates a flow diagram of the exchange of information between portions of the system of FIG. 1A in accordance with embodiments herein.

During use, when the PC application 110 (FIG. 1A) is activated (e.g., opened), the PC application 110 conveys the request for privileges (205) in connection with the client account to the authorization service 135. In the example of FIGS. 2A and 2B, when the PC application 110 is comprised of two applications, APP A and APP B, the APP A operating on the client computing device 120 conveys the request for privileges at 205. The request seeks to obtain privileged access to the client account through an online resource 150. The request for privileges includes the user ID associated with the client account to be accessed through the CAR online resource 150. The user ID may be registered with the application at 204. The request for privileges may also include the application key 111 (FIG. 1A) embedded within the PC application 110. The authorization service 135 generates a single use authorization (SUA) code and saves the SUA code in the data store 133 in a one to one relation with the user ID, thereby associating the SUA code with a specific user ID. The SUA code is provided (206) in response to the request for privileges. The SUA code may also be referred to as an outgoing SUA code to be used in connection with verifying (or authenticating) the PC application 110. The SUA code may be randomly generated at the authorization service 135. Optionally, the single use authorization code may be predetermined or generated based on information received with the request for privileges or otherwise generated. The SUA code may be generated based on the user ID, such as by combining all or a portion of the user ID with a random number. The SUA code may represent a barcode, an alphanumeric string, an audio clip, a video clip, an image or otherwise.

Optionally, the SUA code is temporarily stored in the application master list 137 in connection with the application ID and application key corresponding to the PC application that sent the request for privileges. The SUA code may be presented to the user in various manners. For example, the SUA code may be presented as a quick response (QR) code, or alphanumeric character string or both. A quick response code may represent a 2 or 3 dimensional barcode that may be scanned by a barcode reader (in the client computing device 120), where the quick response code includes unique identification information. When a QR code is used, the QR code may be presented on the display of a first client computing device 120 (FIG. 1A), and a second client computing device 120 may be used to scan the QR code.

The client computing device presents (207) the single use authorization code to the user, such as by displaying the code on the graphical user interface or otherwise. The SUA code may be presented visually, audibly or in other manners to the user. The user reenters the SUA code and enters user credentials at the client computing device. Optionally, the user may enter the SUA code and user credentials into a separate client computing device. Optionally, a portion of the user credentials may be stored in the client computing device, such as encryption keys, certificates and the like. The user credentials stored on the device may be combined with user credentials entered by the user. The SUA code, user ID and user credentials are returned (208) to the authorization service 135 over a separate communications channel that is distinct from the communications channel over which the outgoing SUA code was originally conveyed from the authorization service 135 to the client computing device. The incoming SUA code at 208 is also referred to as a candidate SUA code until verified. For example, the SUA code may be conveyed from the authorization service 135 over one network connection, while the returned SUA code may be conveyed over a separate and distinct connection within the same network, a different network, or a different transmission medium. As examples, the returned SUA code, user ID and user credentials may be conveyed as an SMS message, through email, by telephone or otherwise.

The authorization service 135 validates or verifies (209) the returned SUA code, user ID and user credentials. The returned SUA code is also referred to as a candidate SUA code until validated. When a valid SUA code (and matching user ID) and user credentials are identified, the authorization service identifies (or generates) a permitted action token that corresponds to the action or actions that are permitted by the application to be taken in connection with the CAR online resource. The permitted action token is returned (210) to the client computing device 120 over the network 140. The permitted action token is then conveyed from the PC application 110 and client computing device 120 along with a request to access a client account (211) to the access service 145. The access service 145 determines whether the permitted action token matches the incoming request. When a match occurs, the access service 145 permits a privilege-constrained (PC) session (212) to be established between the client computing device 120 and the CAR online resource 150. Additionally or alternatively, the access service 145 may review each request/response in the PC session and pass requests that correspond to the permitted action token. Additionally or alternatively, the access service 145 may pass responses (back to the client computing device 120) only when such responses correspond to the permitted action token. By monitoring the requests/responses, the access service 145 continuously monitors the PC session to ensure the application complies with the permitted privileges.

In the foregoing manner, the provisioning, authorization and access services interact with an application at numerous points in time, such as during application development, during PC session initialization and throughout the PC session, in order to securely manage the privileges permitted by the PC application, as well as to continuously audit the actions of the PC application, while avoiding undue exposure of user credentials to the PC application.

FIG. 2B illustrates a functional diagram of portions of the system 100 of FIG. 1 as well as certain data, information and content conveyed there between in accordance with an alternatively embodiment. FIG. 2B illustrates functional operations performed by the application developer computing device 118, the client computing device 120, the provisioning service 124, the authorization service 135, the access service 145 and the CAR online resources 150. The operations at 221-225 of FIG. 2B correspond to the operations at 201-205 of FIG. 2A, and the operations at 229-232 in FIG. 2B correspond to the operations at 209-212 in FIG. 2A, and thus these operations are not discussed below in further detail.

The operations of FIG. 2B differ from FIG. 2A in connection with the utilizing a side channel to verify an application. In FIG. 2B, the single use authorization code is conveyed (226) from the authorization service 135 to the client computing device 120. However, the SUA code is conveyed over the side or secondary channel 142 (FIG. 1A) to the client computing device 120, where the side or secondary channel 142 differs from the communications channel in which the initial request (225) was received. For example, the SUA code may be sent via text message, email, telephone and the like to the user. The SUA code is presented (227) to the user and reentered by the user with the user ID and user credentials. The SUA code, user ID and user credentials are conveyed (228) from the client computing device 120 back to the authorization service 135 over the same communications channel as the initial request (225). Thereafter, the authorization service 135 validates the user credentials, user ID and SUA code in the same manner as discussed in connection with FIG. 2A. The authorization service 135 provides a permitted action token and the client computing device 120 establishes a PC session in the same manner as discussed in connection with FIG. 2A.

The application keys, SUA codes and permitted action tokens may be randomly generated in real time, such as through the use of a random number generator. A seed or other initial information may be used in connection with randomly generating the SUA code. Optionally, the application keys, SUA codes and permitted action tokens may be generated and stored prior to an individual application seeking to initiate a PC session.

In the examples of FIGS. 2A and 2B, the permitted action token is returned to the first or primary application (APP A) that initially sent the request for privileged access. Optionally, the permitted action token may be returned to the other application (APP B), namely the secondary application that is communicating over the side/secondary channel. In the event that the permitted action token is returned to the secondary application (e.g., over the secondary channel 142 or the network 140), the secondary application may pass the permitted action token to the primary application in a secure manner. For example, the permitted action tokens may be passed between the secondary and primary applications (APP A and APP B), in the same manner as passwords are conveyed in pending application Ser. No. 14/572,739, titled "COMPUTING DEVICE WITH INTEGRATED AUTHENTICATION TOKEN" filed on Dec. 16, 2014, the complete subject matter of which is hereby expressly incorporated by reference in its entirety. For example, the special-purpose circuitry described in the '739 application may be operated to cause the secondary application to display the permitted action token upon a single display that is shared with general-purpose circuitry that operates the primary application. For example, a mobile device may render a user interface upon a touchscreen through which the user is to input the permitted action token. Upon pressing a button, the special-purpose circuitry causes the permitted action token to be shown upon the touchscreen in a specific area. The general-purpose circuitry operating the primary application cannot read the permitted action token from the special-purpose circuitry operating the secondary application.

Figure 3A:
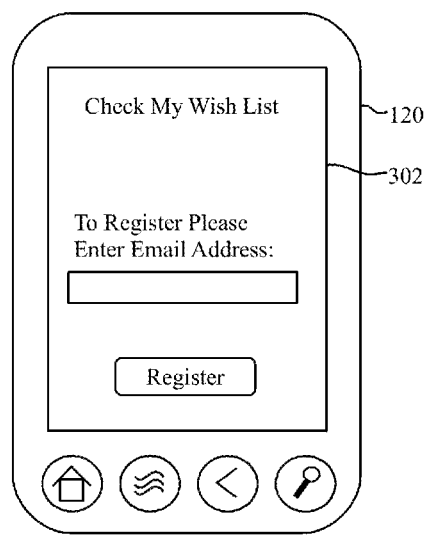
FIG. 3A illustrates an example screenshot of a registration window that may be presented on a display of a client computing device in accordance with embodiments herein.

FIG. 3A illustrates an example screenshot of a registration window that may be presented on a display of the client computing device 120 (FIG. 1A) in accordance with embodiments herein. The registration window 302 may be presented when an application is initially loaded onto the client computing device 120. As one example, the registration window 302 may prompt the user to register by entering the user's email address. Additionally or alternatively, other information about user may be requested in connection with the registration process. Once the appropriate information is entered, the user selects the register icon and the registration information is recorded in the application as all or part of the user credentials and/or user ID to be conveyed in connection with subsequent request by the application for access to CAR online resources.

The user's email address represents one type of user ID that may be recorded by an application at the time of registration (or later). The user ID is utilized by the network service 145 to identify the client account to be accessed by the CAR online resource 150 during a PC session. Client accounts may be associated with different types of user IDs, such as an email address, phone number, user ID, name, IP address and the like. The registration window 302 prompts the user for whatever type of user ID that is appropriate to identify the client account to the network service 147.

Figure 3B:
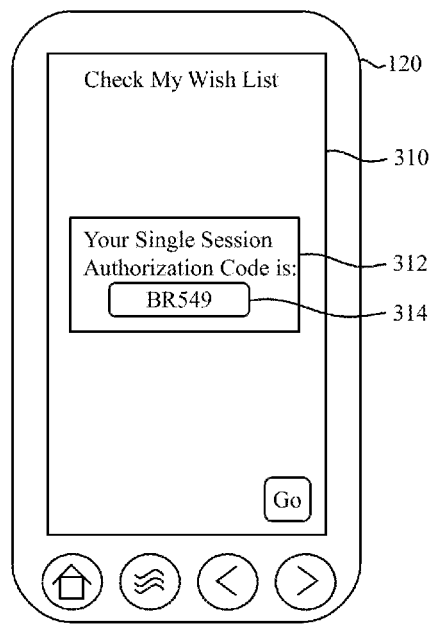
FIG. 3B illustrates an example screenshot that may be displayed on the client computing device in connection with initiating a privilege-constrained session in accordance with embodiments herein.
Figure 3C:
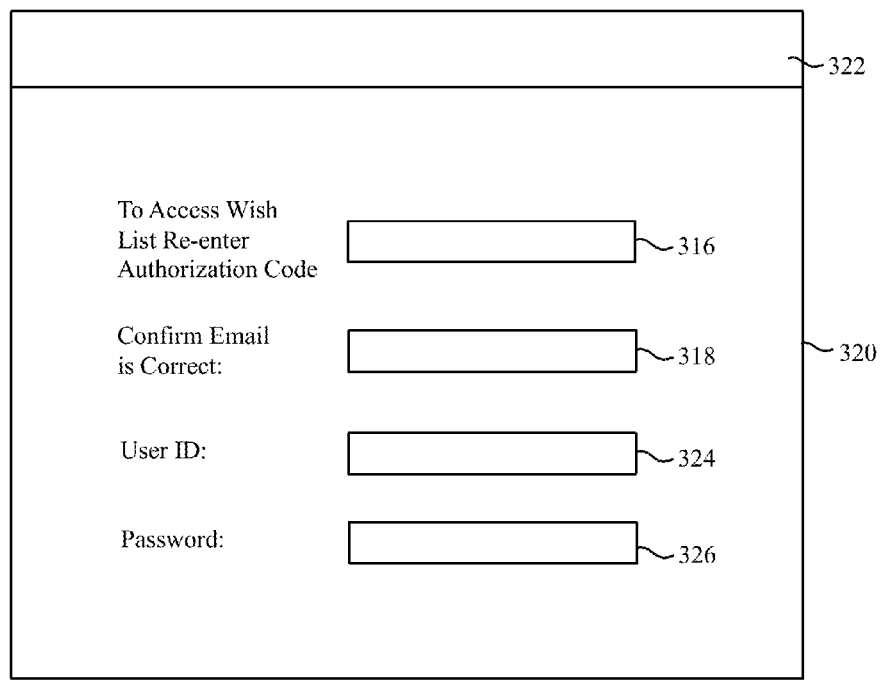
FIG. 3C illustrates an example screenshot that may be displayed on the client computing device in connection with initiating a privilege-constrained session in accordance with embodiments herein.

FIGS. 3B and 3C illustrate example screenshots to be displayed on a common or different client computing device(s) 120 in connection with initiating a privilege-constrained session in accordance with embodiments herein. The screenshot in FIG. 3B presents a session initialization window 310 when an application is opened (e.g. Check My Wish List application). The session initialization window 310 is presented after the client computing device 120 has sent a request for privileges (e.g. 205 in FIG. 2A or 225 in FIG. 2B) to the authorization service 135 and the authorization service 135 has returned a single use authorization code (e.g. 206 in FIG. 2A or 226 in FIG. 2B). The single use authorization code 314 is presented to the user in the presentation window 312. In the example of FIG. 3B, the presentation window 312 states "Your Single Session Authorization Code is: BR549", although it is recognized that various messages (or no message) may be presented in the presentation window 312. Additionally or alternatively, the client computing device 120 may audibly play the message.

In FIG. 3C, the same or a different client computing device displays a confirmation entry window 320 through which the user is requested to enter various information as part of the authentication process. The confirmation entry window 320 may be presented through various manners, such as a web browser, as an email, and the like. In the example of FIG. 3C, the confirmation entry window 320 is presented through a web browser with various user controls presented in the tool bar 322. The user is prompted at a code reentry field 316 to reenter the single use authorization code that will be conveyed over a side channel 142 (FIG. 1A) back to the authorization service for confirmation. As one example, the user may reenter the SUA code 314 by retyping or verbally stating the SUA code 314. Additionally or alternatively, when the confirmation entry window 320 is presented on the same client computing device as the presentation window 312 (FIG. 3B), the user may tap on the SUA code 314 in the presentation window 312, in response to which the application automatically populates the SUA code 314 in the code reentry field 316. It is recognized that the SUA code 314 may be transferred to the code reentry field 316 in other manners.

The confirmation entry window 320 also prompts the user to enter the user ID in a user ID field 324 and to enter user credentials (e.g., password) in a user credential field 326. The user ID and password are the user ID and password associated with the CAR online resource for which the PC application is going to take one or more actions on behalf of the client.

Optionally, an email confirmation field 318 may be presented to ask the user to reenter their email address. The email confirmation field 318 may restate the user email address entered at the time of registration as a confirmation that it is the correct email associated with the client account at the CAR online resource 150. The credential confirmation note 318 may prompt the user to confirm or change the user credential. Additionally or alternatively, user credentials other than an email address or in addition to an email address may be presented at the credential confirmation note 318. Optionally, the credential confirmation note 318 may be omitted entirely, such as when the application has operated once or more in the past and has a relatively satisfactory degree of confidence that the user credentials saved with the application are accurate.

Optionally, the presentation window 312 and confirmation entry window 320 may be presented on separate first and second client computing devices. For example, the presentation window 312 may operate on a laptop, desktop or tablet device that operates the application, while the confirmation entry window 320 is presented on a smart phone or other device capable of establishing a secondary channel of communication with the authorization service 135. It may be desirable at times to utilize separate client computing devices to further enhance the security of the system.

Figure 4A:
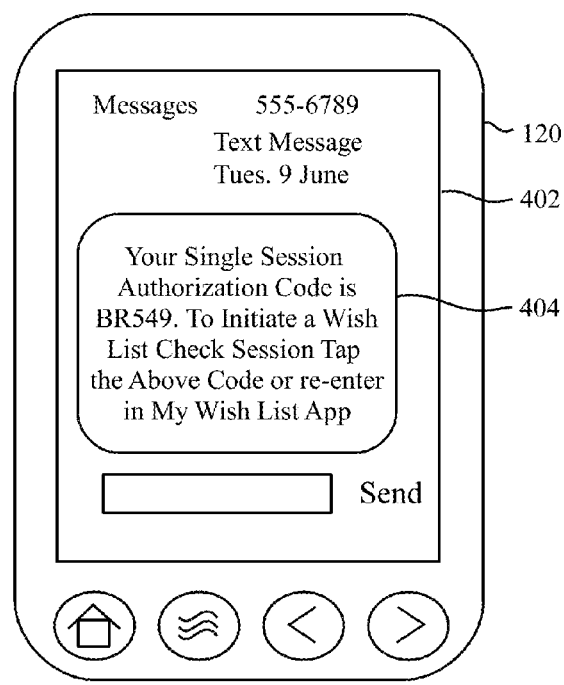
FIG. 4A illustrates an example screenshot of a text message window that may be presented on the client computing device in connection with initiating a privilege-constrained session in accordance with embodiments herein.

FIG. 4A illustrates an example screenshot of a text message window 402 that may be presented on the client computing device 120 in connection with PC session initiation in accordance with an alternative embodiment herein. The text message window 402 may be presented in connection with the operational flow described above in connection with FIG. 2B, wherein the authorization service conveys the single use authorization code to the client computing device through a side channel. In the example of FIG. 4A, the side channel represents an SMS text messaging channel. When an SUA code is conveyed within a text message to a user, the text message 404 may be presented to inform the user that: "YOUR SINGLE SESSION AUTHORIZATION CODE IS BR549. TO INITIATE A WISH LIST CHECK SESSION TAP THE ABOVE CODE OR REENTER IN MY WISH LIST APP".

In accordance with the instruction in the text message 404, the user may simply tap on the SUA code or open the application and reenter the SUA code. The SUA code is then conveyed back to the authorization service along with the corresponding user ID and user credentials over the same communications channel as used to send the initial request.

Figure 4B:
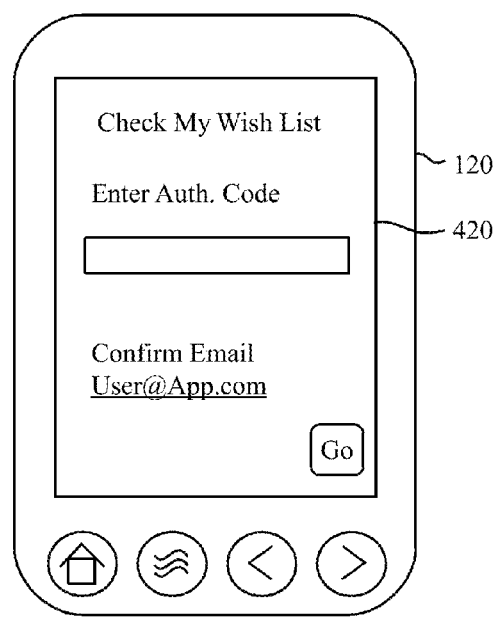
FIG. 4B illustrates an example screenshot of a single use authorization code entry window that may be opened on a client computing device in response to receipt of a text message in accordance with embodiments herein.

FIG. 4B illustrates an example screenshot of the SUA code entry window 420 that may be opened in response to receipt of the text message 404. For example, when the user receives the SUA code in the text message 404, the window 420 may be opened and the SUA code automatically populated into the code entry field. Alternatively, the user may be prompted to reenter the authorization code in the window 420. Optionally, the user also may be prompted to confirm or reenter the user ID and user credentials, such as the email address in the window 420. When the SUA code, user ID and user credentials are entered, the user selects "GO" and the SUA code, user ID and user credentials are conveyed to the authorization service.

Additionally or alternatively, the side channel may be performed utilizing cellular or traditional telephone networks. For example, the user may be presented with the SUA code. The user may then initiate a phone call (e.g. to a toll free number) and enter the SUA code along with user ID and credentials as an authorization request. Thereafter, the authorization request entered by the user through the toll free number is conveyed to the authentication server. The user ID and credentials entered by the user through the toll free number are compared to stored user ID and credentials and the SUA code entered by the user through the toll free number is attempted to be matched to approved SUA code(s) (stored on the application master list). When the user ID, user credentials and SUA codes match, a successful application pairing operation is declared. Otherwise an unsuccessful application pairing operation is declared.

Next, operations are described to be performed by one or more processors executing program instructions saved in memory of one or more of the devices, servers and resources within the system 100. The operations described hereafter may be performed in parallel, serially or in various alternative orders. Further, one or more of the operations may be omitted.

Figure 5A:
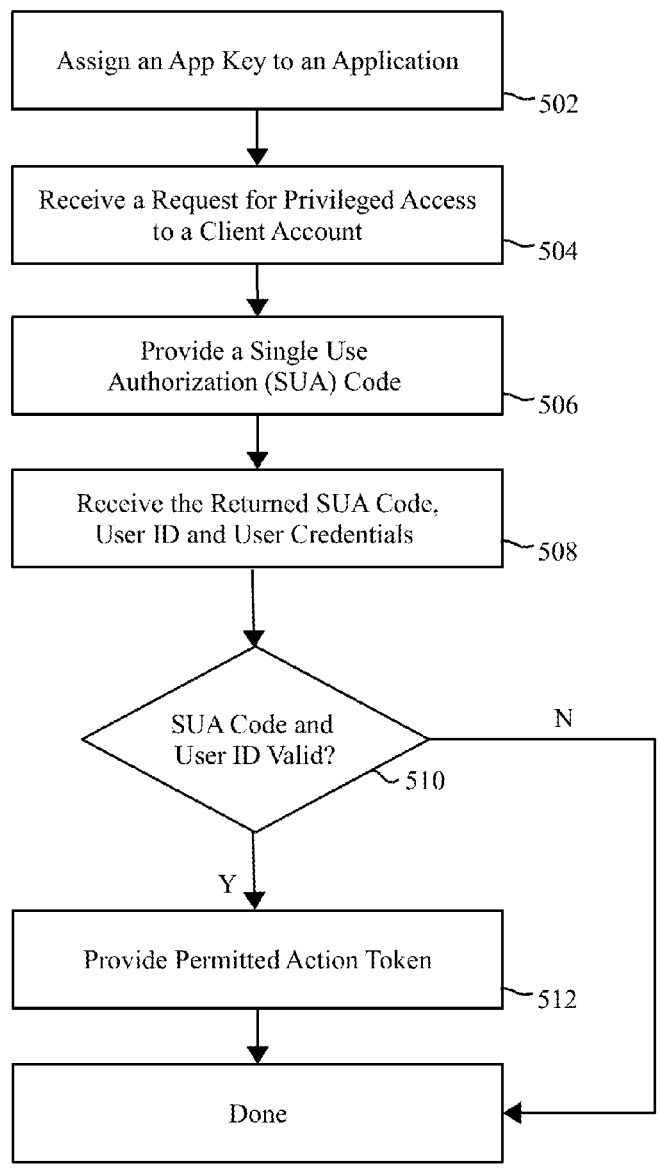
FIG. 5A illustrates a process for initiating a privilege-constrained session with a CAR online resource in accordance with embodiments herein.

FIG. 5A illustrates a process for initiating a privilege-constrained session with a CAR online resource in accordance with embodiments herein. At 502, an application key is assigned by the provisioning service 124 to an application, such as at the request of a developer. Optionally, a pre-existing application may be assigned an application key. For example, the application may have operated previously without constraint. The CAR online resources may be updated to no longer permit the application unconstrained access to client accounts. Accordingly, an existing application may go through a recertification or reregistration process to add the initialization operations described herein to enable subsequent operation. The application key is embedded or otherwise associated with a corresponding privilege-constrained application. The privilege-constrained application is authorized to perform at least one predetermined privileged action in connection with a client account related online resource during a PC session over a secure network connection. The application key is saved in the application master list 137.

At 504, the authorization service 135 receives a request for privileged access to a client account. The request seeks to be granted access to a corresponding client account through one or more online resources 150. The request for privileges includes the application key (e.g., an alphanumeric character string) as well as one or more user ID associated with the client account. The authorization service 135 may compare the incoming application key with application keys saved in the application master list 137. For example, one option is to use a request/message/object cryptographically verifiable. For example, the request/message is created to be cryptographically verifiable by the system to which the request/message is to be provided or another system that operates in conjunction with the system to which the request/message is to be provided. For example, the request/message may be encrypted so as to be decryptable by the system that will cryptographically verify the request/message, where the ability to decrypt the request/message serves as cryptographic verification of the request/message.

As another example, the request/message may be digitally signed (thereby producing a digital signature of the request/message) such that the digital signature is verifiable by the system that will cryptographically verify the request/message. In other examples, both encryption and digital signatures are used for cryptographic verifiability (and security). The application key used to encrypt and/or digitally sign the request/message may vary in accordance with various embodiments and the same application key is not necessarily used for both encryption and digital signing, where applicable. In some embodiments, an application key used to encrypt the request/message is a public key or a public/private key pair where the private key of the key pair is maintained securely by the system to which the request/message is to be provided, thereby enabling the system to decrypt the request/message using the private key of the public/private key pair. Using the public key to encrypt the request/message may include generating a symmetric key, using the symmetric key to encrypt the request/message, and encrypting the symmetric key using the public key, where the encrypted symmetric key is provided to a system with the encrypted request/message to enable the system to use the corresponding private key to decrypt the symmetric key and use the decrypted symmetric key to decrypt the request/message. Further, in some embodiments, the request/message is digitally signed using a private key of a public/private key pair corresponding to the computer system that encrypts and/or digitally signs the request/message (e.g., the client computing device). For example, an application may be provisioned with the private key and the request/message may include a certificate for the private key for use by a system for verification of the digital signature of the request/message. Other variations, including variations where a symmetric key shared between the user computer and the system that cryptographically verifies the request/message is used to encrypt and/or digitally sign the request/message.

Optionally, the authorization service 134 may also compare the user ID with user IDs saved in the data store 133 to determine whether a matching client account is identified. When a matching application key (and optionally user ID) are identified, the authorization service 134 generates a SUA code. Optionally, at 504, the authorization service 135 may not perform any comparison of the information in the request for privileges, but instead simply moved to the operation at 506.

At 506, the SUA code is returned to the client computing device 120 that sent the request for privileged access. The SUA code is uniquely associated with the user ID received with the request for privileged access. For example, the request for privileged access may represent a request to access an e-commerce online resource and the user ID corresponds to the user ID for a particular user's client account on the e-commerce online resource. The SUA code is uniquely associated with the particular e-commerce online resource and user's client account. At 508, the authorization service 135 monitors a side channel for one or more candidate SUA codes, user IDs and user credentials to be returned. The candidate SUA codes, user IDs and user credentials may or may not correspond to valid SUA codes, user IDs and user credentials that were sent by the authorization service 135.

When candidate SUA codes, user IDs and user credentials are conveyed over the side channel, additional information may be provided with the candidate SUA codes, such as identifying information for the application and/or client computing device transmitting the candidate SUA code. The incoming information is used by the authorization server 135 to identify an application from the application master list 137. At 510, the authorization service 135 compares the candidate SUA code, user ID and user credential that is returned with saved SUA codes, user IDs and user credentials that were sent to the client computing devices (and/or PC applications). When the candidate SUA code, user ID and user credentials matches the saved (outgoing) SUA code, user ID and user credentials, the candidate SUA code, user ID and user credentials are declared to be validated or verified. The comparisons at 510 tie or otherwise correlate the SUA code to a particular user ID. Optionally, the user credentials may not be compared at 510, but instead just the candidate SUA code and the user ID. When a match does not occur at 510, the process ends and the authorization service 135 denies initialization of the PC session. When a match occurs at 510, flow advances to 512.

At 512, the authorization service 135 returns a permitted action token to the client computing device 120. The permitted action token may be identified in various manners as described herein. In the foregoing manner, authorization service 135 verifies that the PC application is valid, but yet still only grants the PC application limited privileges with respect to a client account. By maintaining the permitted action tokens at the authorization service 135, control over privileges may be changed, revoked and monitored continuously.

Optionally, a permitted action token may only be obtained once by a PC application during the useful life of the PC application. Alternatively, the permitted action token may need to be verified, replaced or updated periodically or with each new PC session. Optionally, the PC application may be granted different levels of authorization at different points in time. For example, a PC application may initially be granted very limited privileges, such as with a permitted action token having very limited associated privileges (e.g. only authorized to view wish list, only authorized to view account balance). Subsequently, it may be determined desirable to increase the privileges afforded to the PC application 110. For example, a user may choose to increase the privileges associated with the PC application 110. Alternatively, the system 100 may monitor operation of the PC application 110 for a period of time and automatically increase certain privileges after a "test period". When it is desired to increase the privileges afforded to the PC application 110, the authorization service 135 sends a new permitted action token to the PC application 110 for use with subsequent sessions. As one example, a new permitted action token may be provided which supersedes a pre-existing permitted action token, where the new permitted action token identifies multiple privileges that are authorized to be performed by the PC application 110. Additionally or alternatively, a new permitted action token for each additional authorized action may be provided, such that the PC application 110 collects a cumulative set of permitted action tokens associated with one or a subset of privileged actions. While the foregoing example is provided in connection with granting additional privileges or access to a PC application 110, the converse may equally be applied, wherein the privileges granted to the PC application 110 may be reduced over time. For example the user or the system may desire to remove or reduce the actions permitted by the PC application 110. To do so, one or more permitted action tokens (already provided to the PC application 110) may be revoked. Additionally or alternatively, a new (more privilege limited) permitted action token may be issued to the PC application that supersedes a pre-existing permitted action token having greater privileges. Hence, permitted action tokens may be varied to increase and decrease the functionality offered by a PC application over time.

Additionally or alternatively, the PC application 110 may seek to expand the privileges granted to the PC application 110. For example, one or more sessions may be initiated as explained above, with the PC application 110 being afforded a predetermined level of privileges through a first permitted action token. At some point during operation, the PC application 110 may provide a request to the authorization service 135 to receive additional privileges (through issuance of one or more new or additional permitted action tokens). In response to a request for added privileges, the authorization service 135 may send to the client computing device 120 an indication that additional approvals are waiting for acceptance or denial. For example, the window 310 may include an additional privilege request region indicating: "App Check My Wish List Requests Additional Privileges to Your Account. Click Here to See". When the user selects the added privilege request region, a link to a network service (e.g., Amazaon.com) is opened and a resource (e.g. a webpage) is presented. The resource/webpage informs the user of the additional privileges sought by the PC application (e.g., The Check My Wish List App request the privilege to make purchases through your Amazon.com account). The user may then approve or deny the additional privileges. Based on the designation by the user, the authorization service 135 may issue a new permitted action token or deny the request for added privileges.

Figure 5B:
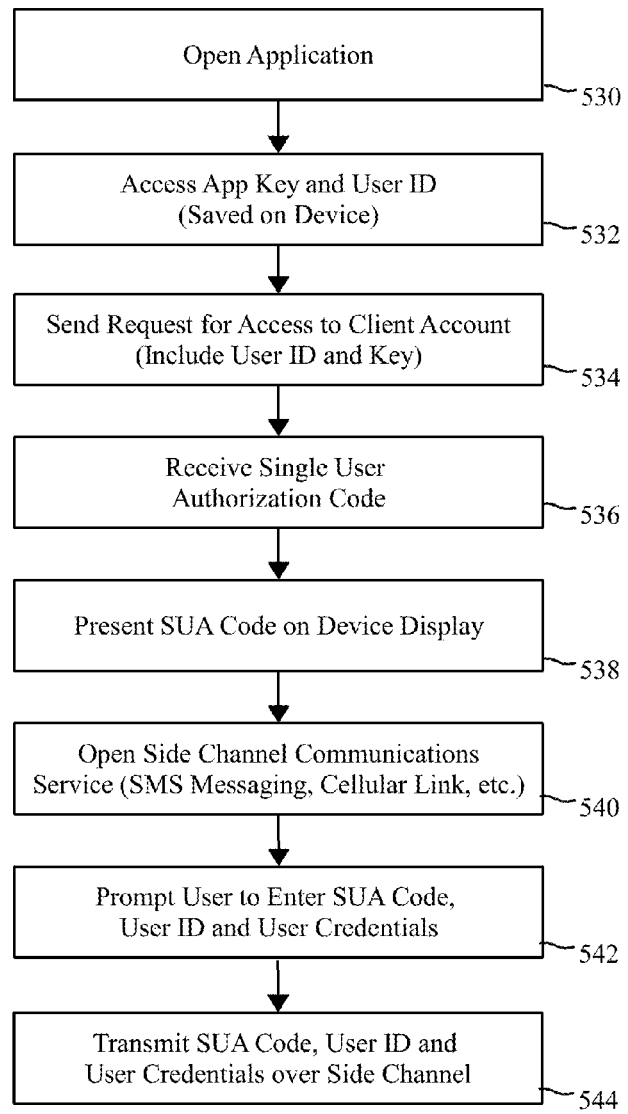
FIG. 5B illustrates a process carried out at one or more client computing devices to initiate a privilege-constrained session in accordance with embodiments herein.

FIG. 5B illustrates a process carried out at one or more client computing devices to initiate a privilege-constrained session in accordance with embodiments herein. At 530, the PC application 110 (FIG. 1A) is open and at 532, the application key and user identifier (ID) are accessed. At 534, a request for privileged access is sent from the client computing device 120 to the authorization service 135. The request for privileged access includes the application key and user ID, among other information. At 536, the client computing device 120 (or a different client computing device) receives a SUA code that is presented (at 538) to the user, such as on the display of the client computing device 120. At 540, the client computing device 120 (or a different client computing device) opens a side channel to communicate with the authorization service 135. Various examples are explained herein for the side channel. At 542, the client computing device 120 prompts the user to reenter the SUA code, the user ID and user credentials. At 544, the client computing device transmits the SUA code, user ID and user credentials over the side channel 142 to the authorization service 135.

Additionally or alternatively, the PC application may include first and second applications that are operating on a single client computing device or on first and second respective client computing devices. The first application performs the operations at 530-538 on a first client computing device and manages communication with the authorization service 135 over a first channel (e.g. through the network 140 in FIG. 1A). The second application performs the operations at 540-542 on the same first client computing device and/or on a second client computing device. The second application manages communication with the authorization service 135 over a second channel (e.g. channel 142).

Figure 5C:
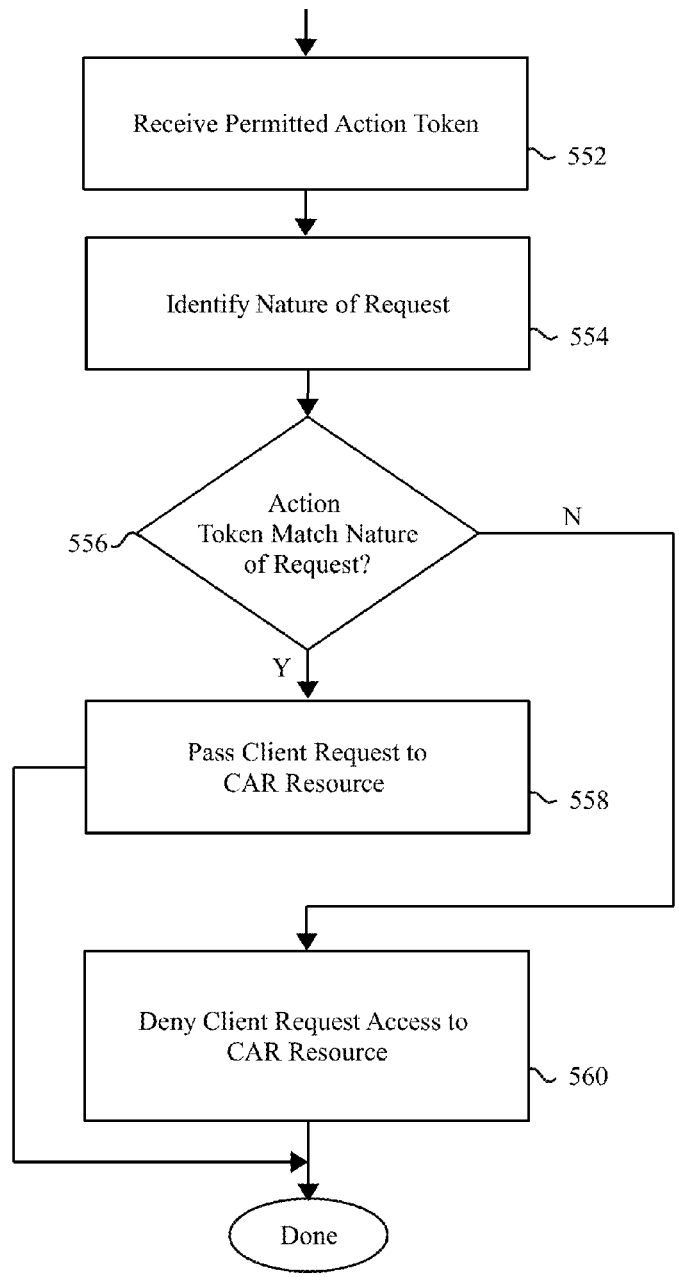
FIG. 5C illustrates process for monitoring and maintaining compliance with privilege limits during a privilege-constrained session in accordance with embodiments herein.

FIG. 5C illustrates process for monitoring and maintaining compliance with privilege constrains during a privilege-constrained session in accordance with embodiments herein. One or more of the operations in FIG. 5C may be performed at the access service 145. At 552, the access service 145 receives a client request for access from a client computing device 120 related to a CAR online service 150. The client request directs the CAR online resource to perform an action of interest. The operations of FIG. 5C determine whether the action of interest falls within or outside the limited set of privileges to which the PC application is constrained. The client request for access also includes a permitted action token. The permitted action token is indicative of the privilege or privileges allowed by the PC application 110 and client computing device 120.

At 554, the access service 145 analyzes the request for access to identify nature of the request. For example, the request may direct the CAR online resource 150 to perform certain actions in connection with a client account, to return user specific account information, and the like. By way of example, the access service may establish a deny policy wherein, by default, some or all actions are denied. The access service 145 may identify the specific action associated with the request or the general nature/classification of the nature of the request.

At 556, the access service 145 determines whether the permitted action token corresponds to the nature of the request. When a permitted action token corresponds to the nature of the request, flow advances to 548. Otherwise, the request is denied and flow advances to 560. For example, the permitted action token may indicate that an application is permitted to retrieve select types of information from a client account, such as a list of items in a Wish List. When the nature of the request seeks to retrieve the select types of information, the request is approved. Alternatively, when the nature of the request seeks to perform a financial transaction (e.g., buy the items on the Wish List), the request may be denied. As another example, the permitted action token may indicate a dollar limit, a time limit or a number of transactions that is permitted in connection with the client account. When the nature of the request exceeds the dollar limit, time limit or transaction number, the request is denied.

At 558, the access service 145 passes the client request to the CAR online resource 150. At 560, the access service 145 denies the client request and blocks further communication with the CAR online resource 150.

Thus, the operations at 556-560 monitor client requests that seek to direct the CAR online resource to perform an action of interest. The client requests are monitored relative to the limited set of privileges authorized. At 558, the method passes the client request to the CAR online resource when the action of interest falling within the limited set of privileges identified by the permitted action token. However, at 560, the method denies the client request access to the CAR online resource when the action of interest falls outside the limited set of privileges. The permitted action token includes an indication that the privilege-constrained application is authorized to perform at least one permitted action. For example, the permitted action token may specifically identify permitted actions or groups/classes of permitted actions. Additionally or alternatively, the permitted action token may include an indication that the PC application is denied permission to perform at least one blocked action in connection with a client account utilizing the CAR online resource.

Optionally, the operations of FIG. 5C may be simplified such that the access service 145 only reviews the permitted action token once at the time of initiating a PC session. When the permitted action token is validated at the access service 145, the access service 145 may permit a PC session without further review of client request within the PC session. When a PC session terminates, a new permitted action token may be required by the access service 145 before a new PC session could be established.

Optionally, the SUA codes generated by the authorization service may be varied in length and/or complexity based on various parameters, such as the length of time that the SUA code will be valid, the number of customers using the system, the length and complexity of the path over which the SUA code is conveyed to reach a client computing device and the like.

Additionally or alternatively, the SUA code may be generated in accordance with the processes described in application Ser. No. 14/470,886, filed Aug. 27, 2014, and titled "HUMAN READABLE MECHANISM FOR COMMUNICATING BINARY DATA," the complete subject matter of which is incorporated herein by reference in its entirety. For example, the authorization service 135 (FIG. 1A) may access a dictionary (stored in the data store 133) and utilize the dictionary to generate SUA codes that are human readable messages (e.g., "Today is Tuesday", "Flower", "purple rabbit", "white snow", "see jack run"). Human readable SUA codes are easier to remember when reentering the SUA code. For example, a combination of predefined symbols may create an SUA code that spells one or more words. The word(s) may include adjective-noun-verb combinations such that each symbol contains an adjective, a noun and a verb in the ascribed order, for example, the symbol 'red chimp run.' Furthermore, a dictionary may change according to the language or region designated by a user or a computing device. For example, the system may utilize the above-mentioned mechanism to display binary information to users of the client computing devices. Furthermore, the system may obtain a dictionary based at least in part on the region settings of the mobile device, such as United States English. If the user then changes the language or region setting of a client computing device, the system may then seed the dictionary with words from the particular language or region selected. In some embodiments, the symbols may be normalized based at least in part on the language or region selected. For example, in some languages, such as Russian, word order may be changed without changing the meaning of the words or affecting human readability. However, in other languages, such as English, word order may affect meaning and human readability and therefore may be normalized to account for word order. In some embodiments, the words may include characters or symbols. For example, the dictionary may include words consisting of Chinese characters.

As a further example, the symbols generated from the dictionary may include an adjective-noun-verb tuplet. In another example, the symbols generated from the dictionary may include a preposition-verb-noun-adjective tuplet. In various embodiments, the n-tuplets may be ordered such that the order in which that item appear in the n-tuplet is significant. For example, the ordered n-tuplet (where n=2) 'yellow dog' is different from 'dog yellow.' Furthermore, the dictionary may be seeded with two or more sets of words or morphemes that the two or more sets are disjointed (e.g., do not have any members in common). For example, a dictionary seeded with the set of adjectives and the set of verbs may be disjointed in that there are not words in common between the set of adjectives and the set of verbs. In some embodiments, the symbol may be configured such the category of the word and/or the location of the word in the symbol may have no corresponding bit value. For example, the second word in a three word symbol may have no corresponding bit value.

The dictionary may also be a curated dictionary such that the words included in the dictionary are selected based at least in part on one or more various factors including length, difficulty to read, difficulty to pronounce, grade level or other factors suitable for discriminating between words that may be included in the dictionary. For example, the dictionary may be curated such that homonyms, homophone, homographs, heteronyms and other words that may produce human errors are removed. These categories of words may cause errors such that one or more words in a symbol are misread and or replace with another word. For example, the word "air" and "heir" or "die" and "dye" may be interchanged when read by a human. Alternatively, the symbol table may be configured such that homonyms, homophones, homographs, heteronyms and other words that may produce human errors map to identical values to avoid errors. For example, the words "fairy" and "ferry" may map to equivalent values such that interchanging these words in a symbol do not cause the symbol to map to a different value. In another example, the mechanism may be used in connection with voice recognition software to capture the symbol or set of symbols from the human operator, in such scenarios, the dictionary 102 may be curated to include words that are recognizable by the voice recognition software.

Figure 6:
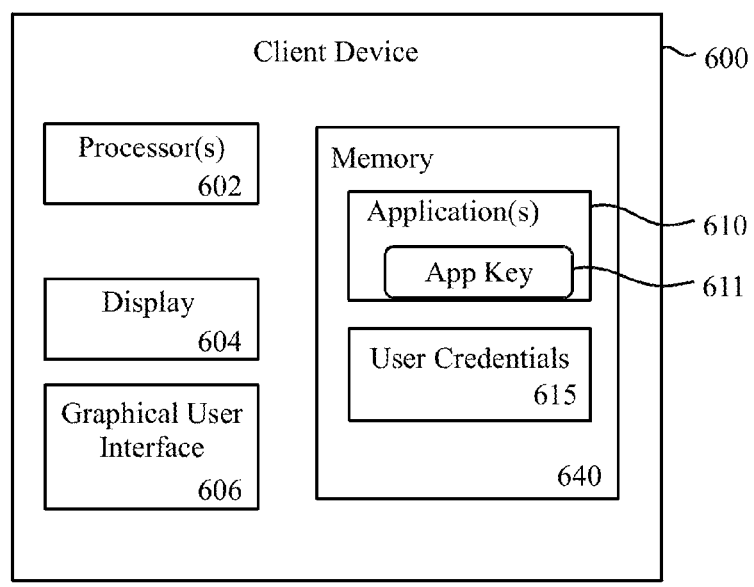
FIG. 6 illustrates a block diagram of a client computing device in accordance with embodiments herein.

FIG. 6 illustrates a block diagram of a client computing device 600 utilized in accordance with embodiments herein. The client computing device 600 includes one or more processors 602 and memory 640 that stores program instructions directing the processors 602 to perform the operations described herein. The client computing device 600 also includes a display 604 and graphical user interface 606 to present information and content to users and to receive inputs and instructions from users. The memory 640 includes a PC application 610 stored therein, with the PC application 610 including an application key 611 to be used as discussed herein. The memory 640 also stores user credentials used in connection with one or more CAR online resources. The memory 640 also stores one or more SUA codes and one or more permitted action tokens received from the authorization service 135.

Closing

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device 510 (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A non-transitory computer-readable storage medium having stored thereon executable instructions that, as a result of execution by one or more processors, cause the one or more processors to:
    assign an application key to a privilege-constrained application that is configured to load onto a client computing device, the privilege-constrained application loaded onto the client computing device with limited privileges, wherein the privilege-constrained application is authorized to perform at least one permitted action and lacks permission to perform at least one blocked action in connection with a client account;
    receive a request for privileged access to the client account through an online resource, the request including a user identifier associated with the client account and the application key;
    determine that the application key matches a stored application key associated with the privilege-constrained application and associated with the user identifier;
    provide a single use authorization (SUA) code allocated for the privilege-constrained application and associated with the user identifier upon the successful determination;
    receive a candidate authorization code and user identifier;
    validate the candidate authorization code based on the SUA code provided; and
    provide a permitted action token based on the validate operation, the permitted action token is presented by the privilege-constrained application to an access service, and the permitted action token indicates that the privilege-constrained application is authorized to perform the at least one permitted action and lacks permission to perform the at least one blocked action in connection with the online resource.

2. The non-transitory computer-readable storage medium of claim 1, further comprising receiving a request from an application developer to develop the privilege-constrained application, assigning an application key to the privilege-constrained application, along with the at least one permitted action and the at least one blocked action.

3. The non-transitory computer readable storage medium of claim 1, wherein the authorization code is provided from an authorization service to a client computing device over a first channel the candidate authorization code is received by the authorization service over a second channel.

4. A computer implemented method for managing access to a client account utilizing a remote resource, comprising:
assigning an application key to a privilege-constrained application that is configured to load onto a client computing device, the privilege-constrained application loaded onto the client computing device with limited privileges, wherein the privilege-constrained application is authorized to perform at least one permitted action and lacks permission to perform at least one blocked action in connection with a client account;
receiving a request for privileged access to the client account through an online resource, the request including a user identifier associated with the client account and the application key;
determining that the application key matches a stored application key associated with the privilege-constrained application and associated with the user identifier;
providing a single use authorization (SUA) code allocated for the privilege-constrained application and associated with the user identifier upon the successful determination;
receiving a candidate authorization code and user identifier;
validating the candidate authorization code based on the SUA code provided; and
providing a permitted action token based on the validate operation, the permitted action token is presented by the privilege-constrained application to an access service, and the permitted action token indicates that the privilege-constrained application is authorized to perform the at least one permitted action and lacks permission to perform the at least one blocked action in connection with the online resource.

5. The method of claim 4, wherein the authorization code is provided to a client computing device over a first channel and the candidate authorization code is received over a different second channel.

6. The method of claim 5, wherein the second channel represents one of a short messaging service (SMS) messaging channel, an email channel, or a telecommunications channel.

7. The method of claim 5, wherein the remote resource represents an online resource.

8. The method of claim 4, further comprising:
receiving the permitted action token and a client request from the privilege-constrained application, and
managing client requests based on the permitted action token.

9. The method of claim 8, wherein the client request directs remote resource to perform an action of interest, the method further comprising passing the client request to the remote resource when the action of interest falling within the limited set of privileges identified by the permitted action token.

10. The method of claim 8, further comprising denying the client request, access to the remote resource when the action of interest falls outside the limited set of privileges.

11. A system for managing access to a client account utilizing a remote resource, comprising:
at least one processor; and
a memory, coupled to the at least one processor, storing program instructions when executed configures the at least one processor to:
assign an application key to a privilege-constrained application that is configured to load onto a client computing device, the privilege-constrained application loaded onto the client computing device with limited privileges, wherein the privilege-constrained application is authorized to perform at least one permitted action and lacks permission to perform at least one blocked action in connection with a client account;
receive a request for privileged access to the client account through an online resource, the request including a user identifier associated with the client account and the application key;
determine that the application key matches a stored application key associated with the privilege-constrained application and associated with the user identifier;
provide a single use authorization (SUA) code allocated for the privilege-constrained application and associated with the user identifier upon the successful determination;
receive a candidate authorization code and user identifier;
validate the candidate authorization code based on the SUA code provided; and
provide a permitted action token based on the validate operation, the permitted action token is presented by the privilege-constrained application to an access service, and the permitted action token indicates that the privilege-constrained application is authorized to perform the at least one permitted action and lacks permission to perform the at least one blocked action in connection with the online resource.

12. The system of claim 11, wherein the memory includes a data store that stores client account records that include a listing of accounts and remote resources to which the accounts correspond, the client account records including information identifying clients that have registered for a corresponding remote resource.

13. The system of claim 11, wherein the program instructions are further executable by the at least one processor to generate a second permitted action token that at least one of adds, removes or changes a limited set of privileges associated with the privilege-constrained application.

14. The system of claim 11, wherein the permitted action token identifies a limited set of privileges that the privilege-constrained application is authorized to perform in connection with an online resource that represents the remote resource.

15. The system of claim 11, wherein the authorization code is provided to a first application over a first channel and the candidate authorization code is received from a second application over a different, second channel, the first and second applications collectively defining the privilege-constrained application.

* * * * *